Patented July 16, 1940

2,208,290

UNITED STATES PATENT OFFICE 2,208,290

UREA-FORMALDEHYDE CONDENSATION PRODUCT AND METHOD OF PRODUCTION

Eustace Glycofrides, Philadelphia, Pa.

No Drawing. Application June 7, 1937,
Serial No. 146,860

19 Claims. (Cl. 260—29)

The present invention is a condensation product of the urea-formaldehyde type, and relates to various products which may be made therefrom, and to methods of producing the same. This application is a continuation in part of my co-pending application Serial No. 5615, filed February 8, 1935.

An object of the present invention is to produce, if desired, a water-clear, stable, glass-like resin.

Another object of my invention is to manufacture a urea-formaldehyde type condensation product which can be rendered substantially completely anhydrous, and which is substantially free from uncombined formaldehyde, with comparative ease on a commercial scale.

Another object is to provide a method for reacting urea and formaldehyde in such a manner as to produce, if desired, a product in which the reacted proportions are substantially 1.0 to 1.5 or so molecules of formaldehyde to one of urea, preferably, however, one molecule of formaldehyde to one of urea.

A further purpose is to render urea-formaldehyde type condensation products less susceptible to cracking and brittleness, less hygroscopic and more stable, regardless of size or bulk, throughout the temperature ranges at which water is liquid, and up to about 150° C.

Another object of the invention is to provide a synthetic resin which is highly resilient, strong stable under heat, moisture, actinic light rays, severe weather conditions and even to boiling water for long periods of time.

An additional purpose of the invention is to produce, if desired, a thermoplastic, transparent urea-formaldehyde type condensation product by the admixture of various transparent materials, such as transparent cellulose compounds, methyl methacrylate, vinyl resins, alkyd resins, or other transparent thermoplastic substances.

Another important object of the invention is to provide a method for reacting an urea type compound and a formaldehyde type compound to a particular end point at which the reaction is completed and at which point I have discovered the water and free formaldehyde may be substantially completely removed.

Another object of the invention is to provide methods for facilitating the detection of the said end point.

Another object of the present invention is to provide, if desired, a method for introducing waterproofing agents for the condensation product, so as to render the ultimate product even less hygroscopic, and in addition, if desired, to provide waterproofing agents which do not injuriously affect the transparency of the product.

Another object of the present invention is to provide a method for producing a varnish or paint of urea-formaldehyde type condensation product, and in addition methods for introducing various solvent, plasticizer, dryer or other compounds.

Another object of the invention is to provide a novel, synthetic, urea-formaldehyde type resin molding powder capable of being molded under heat and pressure to a final product in a very short time and at any desired temperature lying within a much wider range and being much higher, if desired, than ever used heretofore.

Another object of the invention is to provide a product into which may be incorporated various fillers such as fibrous material, wood pulp, asbestos, sulphate pulp or the like, and which may be molded with laminated sheets of various materials to produce laminated products.

It is a further object of the invention to provide a synthetic resin which is relatively elastic, which has relatively great tensile strength, and which is capable of coating cloths, papers or textiles including mineral, animal or vegetable fibers such as cotton, asbestos, silk, wool, flax or artificial silk.

Another object of the invention is to provide an anhydrous condensation product which may be made selectively soluble in water, ethyl alcohol, methyl alcohol, acetone, ethylene acetate, fusel oil, methyl acetate, butyl alcohol, ethyl methyl benzol, ethyl lactate, toluol, diethyl phthalate, glycol ethers, Cellosol, ethylene-diethylene-triethylene glycols, castor oil, linseed oil, China-wood oil, triphenyl phosphate, butyl tartrate, butyl stearate, and butyl propionate or other solvents for paints or coating materials.

Another object of the invention is to provide a synthetic resin which may be made soluble in water and/or alcohol, and also capable of being colored and tinted with pigments such as iron oxide, lithopone, carbon black, whiting, china glaze, litharge, organic dyes or the like to form paints, etc.

Experimenters who have attempted to obtain urea-formaldehyde type condensation products in objects of substantial size have been troubled by the marked tendency of the condensation product to crack and the lack of resistance to moisture. The condensation product has also in the past exhibited abnormal shrinkage. To avoid the tendency to crack, and the excessive shrinkage, efforts have been made to eliminate the water which is present in the urea-formaldehyde type condensation products produced according to previous processes. It will be remembered that water is produced during the condensation reaction, and that the formaldehyde is absorbed in water. The water apparently becomes colloidally associated with the condensation product, and is very difficult to remove without injuriously affecting the condensation product. For example, in the prior art it has been found impossible to remove more than about half of the water content, that is, difficulty has been experienced in attempting to reduce the water content from about 50% of the total condensation mixture to less than about 25%. Efforts to remove further quantities of water have either been unsuccessful, or have been accomplished by means which destroyed the transparency and permanency of the condensation product.

Among the efforts made in the prior art to remove water, various experimenters have introduced condensing agents which accelerated or retarded the condensation due to the existence of uncontrolled side reactions. For example, plasticizers have been employed to retard the reaction to such an extent that the water could be removed, but when they were employed the art was successful in removing only about one half of the water. The removal of water by chemical means is difficult because chemical dehydrating agents react with the condensation mixture.

In the prior art little importance was attached to the size of the molecule during the condensation stage of the reaction, and marked changes in viscosity of the condensation mixture occurred as the condensation progressed. The increase of the size of the molecule during the condensation is partly due to hydration, rendering the production of anhydrous material much more difficult, if not impossible.

The prior investigators were unaware of the proper end point of the condensation stage, and the point at which vacuum distillation to remove the water should begin. The common expedients were to cool the sample and observe its milkiness or to note when the condensation mixture became hydrophobic, as by dropping a specimen into water.

My investigations indicate that it is by no means necessary to wait until the condensation mixture is hydrophobic before beginning vacuum distillation, and, in fact, I have found that the condensation stage should cease while the reaction mixture is still hydrophilic.

In the conventional practice for producing urea-formaldehyde type condensation products, which I follow in part, the formaldehyde and urea are brought together in a vessel suitable to apply heat and permit condensation of the vapor, preferably a kettle equipped with a reflux condenser. The kettle should preferably be glass-lined, or made of some non-contaminating and non-reacting material such as nickel, stainless steel, etc. The vessel should also be provided with a suitable agitating means, such as a stirring device, air jet or the like.

It will be understood that wherever I refer herein to urea or to a compound of the urea type I mean to include urea and substances which react similarly, some of which are noted below, and that wherever I refer to a compound of the formaldehyde type I mean to include formaldehyde and compounds which react similarly, some of which are noted below. Whenever in the claims I refer to a urea-formaldehyde condensation product or to urea or to formaldehyde, I mean to include equivalents of urea and equivalents of formaldehyde, as for example, those noted below.

In the methods of my invention I may use commercial or chemically pure urea or its derivatives, such as methyl urea, ethyl urea, methylene urea, ethylene urea, methyl acetyl urea, alpha diethyl urea, triethyl urea, thioureas, sulphur ureas and the like. I prefer to use commercial urea because of its lower cost, rather than the derivatives of urea. Instead of commercial urea, I may also use thiourea or its derivatives, cyanamid, dicyanamid, ammonium thiocyanate, and the like. An aqueous solution of formaldehyde, preferably a commercial 35% solution, is desirably used, although derivatives and polymerized forms of formaldehyde, such as para-formaldehyde, meta-formaldehyde, hexamethylene tetramine, trimethylene tetramine and the like, or their equivalents, may be used. Of course, when substitutes are used for urea or formaldehyde, it may be necessary to use special solvents as well known in the art.

In starting the reaction of urea and formaldehyde, I preferably use an excess of formaldehyde over urea in proportions greater than about 1.6 molecules of formaldehyde to 1.0 molecule of urea. For ordinary and most economical results I generally use proportions lying within the range of about 1.6 to 2.0 (preferably 1.8) parts by weight of formaldehyde and water to 1.0 part of urea.

The formaldehyde I use may be either freshly distilled formaldehyde whose pH value is generally about 6.2, or if desired I may also use a commercial formaldehyde whose pH value, originally more acid, may be adjusted to any suitable pH within ranges more fully brought out hereinafter.

It is also possible to use mixtures of commercial and freshly distilled formaldehyde in any desired proportions which may result in the pH which it is desired to use at the beginning of the reaction. By using pure formaldehyde or mixtures of pure formaldehyde and predetermined quantities of commercial formaldehyde, I may entirely dispense with condensing agents in the reaction. However, I may use only commercial formaldehyde and adjust the pH to the desired value, using preferably a stable condensing agent such as triethanolamine, the carbonates, or suitable oxides, preferably zinc oxides or the like. By using stable condensing agents it is possible to avoid side reactions, and thus retain a constant pH throughout the reaction stage, thus facilitating the determination of the end point. But in order to practice the invention it is not necessary to maintain the pH constant, as the end point may be determined by various suitable means brought out more fully hereinafter.

Generally speaking, the present invention contemplates reacting the urea with the formaldehyde, preferably in a range of pH's of about 4.2 to 6.2, to about an end point at which the reaction ceases, which end point may be detected by the beginning of a marked increase in viscosity or ohmic resistance in the reaction mass, the length of time required to reach this end point being directly, although not necessarily uniformly proportional to the pH; then removing the water and all of the unreacted excess of formaldehyde present in the reaction mass, preferably by means of vacuum distillation, which simultaneously lowers the temperature and arrests further reaction therein, to produce a viscous, anhydrous, pure, inter-reaction product, having little or no water or free formaldehyde present.

Preferable pH Values

The reaction should preferably be carried on within a pH range of from about 6.2 to 4.2. If it is desirable to produce a cast material, or a harder resin, or a material in which it is desired to use plasticizers, I have found it advisable to use a lower pH, below 6.2, and preferably between 5.0 and 4.2. The most desirable pH for this purpose is about 4.2 or 4.4. With pH's in this relatively low range, the reaction may be carried on in a few minutes, say from about two to six minutes, and in this type of reaction a smaller molecule is produced, which I have found advantageous for cast materials.

However, when producing lacquers, varnishes, molding materials, more flexible material, or various other products, I may cause the reaction to be carried on at a higher pH, up to about 6.2, which may cause the reaction to take from about an half hour to many hours' time, thereby producing a longer molecule.

When carrying the reaction at higher pH's, and for longer periods of time, I have found it more difficult to remove every last percentage of water from the reaction mass, as some molecules of water may be entrained in the enlarged molecules. But even at higher pH's, requring a reaction of about twelve hours, I may subsequently remove all the water with the exception of a more or less insignificant 1% or so. On the other hand, at lower pH's, requiring shorter periods of time, I remove substantially every last vestige of water in the reaction mass.

A pH of 4.2 (indicating relatively high acidity) causes a quick reaction of about two minutes, but lower pH values result in almost immediate precipitation of a powdered condensation product which cannot be easily worked. A pH of more than about 6.2, on the other hand, causes a very slow condensation, so that as many as fourteen to twenty hours are required to reach an end point, and there is a likelihood of gelatinization.

In any event, when the urea and formaldehyde are first mixed it is generally best to have them at a pH of about 6.2 so that various intermediate reactions and products, such as ethylene urea or the like, are avoided. The mixture is then brought to a boil. The acidity may then be increased by the addition of a suitable stable acid such as lactic, citric acid or the like, until the pH value is in the desired range, according to the type of molecule or the time of reaction which is desired.

I may even eliminate the use of these acids, by starting the reaction with a predetermined quantity of freshly distilled formaldehyde mixed with a proportional quantity of urea, bringing the reaction mass to a boil, and then adding predetermined quantities of commercial formaldehyde whose pH may be about 3.2, also mixed with a suitable proportion of urea.

By this latter procedure there is no material interference with the ultimate end point of the two additions of urea and formaldehyde, since the first portion of urea and formaldehyde were brought to a boil at a high pH at which the reaction is very slow.

Condensing Agents

My reaction does not depend upon condensing agents. While various condensing agents may be used, as brought out hereinafter, I have found that many of them are undesirable in that they may radically change the pH value, or accelerate the reaction to an excessive degree, and render the detection of the end point more difficult, if not impossible. Moreover, the use of some condensing agents will actually increase the viscosity, due to side reactions, for example, the formation of excess cyanates or formates, without having the reaction mass even reach the end point, thus rendering the detection of the end point very difficult, and the complete removal of the water almost impossible. Examples of these condensing agents used in the prior art are ammonium hydroxide, sodium hydroxide, pyridine, or some compound of similar type, but these I have found cause side reactions which interfere with the proper reaction of the primary ingredients.

Freshly distilled formaldehyde, and especially commercial formaldehyde, deteriorates rapidly with the formation of para-formaldehyde, meta-formaldehyde and formic acid. If this formic acid is neutralized with various substances such as alkali hydroxides, there will be produced formates which are powerful accelerating agents, and thus make detection of the end point very difficult, if not impossible. I preferably use, therefore, in neutralizing the excess formic acid, if any, a stable neutralizing agent such as triethanolamine, carbonates, zinc oxide or the like. The use of these substances inhibits the tendency of side reactions, and also assists in maintaining a constant pH during the condensation stage.

Where the formaldehyde is strictly fresh and of reasonably high purity, containing no measurable quantity of formic acid, I may altogether dispense with the use of any basic neutralizing agents. In this case the pH of the formaldehyde may be about 6.2 to 6.4.

The methods and preferable substances used in rendering the reaction mass more acid after bringing to a boil have been mentioned hereinabove in connection with pH values.

End Point of the Reaction

The reaction is continued to an end point at which the reaction ceases. During this time the urea combines with the formaldehyde, splitting out water. If the reaction is carried beyond the end point, the reaction mass will begin to hydrate taking on water in such a manner that it appears to be chemically combined, and its subsequent removal is rendered impossible. The presence of this end point has not been appreciated heretofore, and it has been general practice to carry the reaction far past the end point until the mass became hydrophobic, but at this stage of the reaction the mass had hydrated to an irretrievable degree.

It is possible to detect my end point in various manners. The most convenient method of detecting the end point is noting the point at which the viscosity begins to increase. The viscosity increase manifests the beginning of the hydration stage, and thus it is preferable to stop the reaction at a point just before or at the change of viscosity.

The viscosity increase may be determined conveniently by timing the discharge of standard samples of the reaction mass from a pipette, taken at constant temperatures and at suitable intervals during the condensation stage. The times required for the discharge of the various standard samples taken at intervals should remain substantially constant until the end point is reached, this being detected by the increased time taken for discharging the later samples. Other suitable methods of measuring viscosity change may also be used.

Another method which may be used to advantage in detecting the end point is by measuring the electrical conductivity or ohmic resistance of the reaction mass throughout the reaction. If the reaction is carried out properly, the ohmic resistance will remain constant until the end point is reached, and then it will begin to rise, indicating the beginning of hydration.

Another method which may be used, although ordinarily this is not as accurate, and for this reason is not particularly recommended, is dropping standard samples of the reaction mass into a test tube containing methyl alcohol. Those samples taken before the end point is reached will be soluble in the methyl alcohol, but after the end point is reached the reaction mass causes a slight milkiness or cloudiness in the methyl alcohol. It is to be noted, however, that the reaction mass is completely soluble in ethyl alcohol and water throughout this stage.

Another method for detecting the end point, particularly when reacting large quantities of the ingredients, makes use of the index of refraction of the reaction mass. I have found that the index of refraction of the reaction mass gradually increases from the moment reaction is begun until the material is fully hydrated. In utilizing this phenomenon, I first react small samples of the ingredients to note the index of refraction at which the end point is reached in the samples. The end point in the samples may be detected by any of the methods above noted. When the index of refraction of the sample at the end point is known, it is possible to react identical ingredients in the same proportions and under the same conditions as the sample, but in large quantities, as for example 500 to 1000 pounds more or less as desired, and then during the reaction of this large mass, measuring the index of refraction at short intervals until the end point index of refraction is reached.

By resort to index of refraction measurements, it is possible to stop the reaction, not only immediately at the end point, but also if desired slightly before the end point is reached, by merely ceasing the reaction at an index of refraction slightly less than the end point index of refraction measured from the sample. The index of refraction may be measured by the use of a conventional refractometer, the use of this instrument enabling the index of refraction to be measured almost instantly and with extreme accuracy up to at least four decimal points.

REMOVAL OF WATER

The removal of water may be easily effected, as for example by vacuum distillation, if its removal is begun at the end point. The vacuum distillation can be carried out in any suitable vacuum still in which suitable agitation means are provided, and the removal of the water may be complete, or, somewhat less desirably, 5% or 10% of water may be allowed to remain. It will be understood that a product containing 10% or even 5% of water is less desirable than a product which is substantially completely anhydrous, because the water tends to make the resultant product, particularly where waterproofing agents are used, somewhat cloudy or milky. By following the technique of my invention, it is possible to remove substantially all of the water, so that the content of water is less than 1%.

The vacuum distillation is continued until all or substantially all of the water is removed, the length of time for this stage depending upon the degree of vacuum applied, the displacement of the exhausting means, the quantity of material which is being distilled, and the amount of surface exposed to the vacuum. The time is generally from five minutes to several hours, depending upon these factors.

The vacuum distillation not only withdraws substantially all of the water from the material, but also withdraws all of the free formaldehyde, leaving only fully reacted urea-formaldehyde inter-reaction product. So complete is the reaction, and so complete may be the removal of the water and free formaldehyde, that the inter-reacted urea and formaldehyde may be substantially quantitatively inter-reacted in these ideal proportions of one to about one and an half, although preferably one, molecule of formaldehyde to one of urea. This ideal condition accounts in part for the high, superior results achieved by my novel product.

The end of the vacuum distillation stage is the point at which substantially all of the water and free formaldehyde are removed and this may be detected by any suitable means. If the vacuum distillation is carried slightly beyond the completion of this end, no great harm is done, as the material merely begins to polymerize at a slow rate. It is desirable, however, not to permit polymerization to continue too far, as then the material will increase in viscosity, and the elimination of bubbles or seeds, if any, during casting may be rendered more difficult.

The end of the vacuum distillation may be detected by measuring the amount of water and formaldehyde removed from the material, and comparing this with the amount which should be removed as quantitatively computed from the mixture of the original ingredients, assuming that the urea and formaldehyde are reacted in proportions of one-to-one molecules. Thus, the amount of water removed should be equal to the amount of water originally used as a dispersing agent for the reaction, plus the water split out during the condensation stage. The formaldehyde which is removed during this process should be equal to the excess of formaldehyde used above the proportions of one molecule of formaldehyde to one of urea. The measurement of the water and free formaldehyde removed by vacuum distillation may be made by any suitable means, as one skilled in the art would readily understand.

As a practical matter, when reacting the materials in large bulk form, it is generally more convenient to resort again to the use of index of refraction measurements. As before, this is done by first vacuum distilling a small standard sample of the ingredients, measuring the index of refraction at short intervals during the vacuum distillation, and simultaneously at the same intervals, measuring the quantity of water and free formaldehyde removed. The index of refraction at the point at which all of the water and free formaldehyde, as theoretically computed, in the material have been removed should be noted. This index of refraction then becomes the standard at which the reaction mass in bulk form may be distilled. It may be desirable to carry the vacuum distillation slightly beyond this index of refraction for safety's sake.

At the conclusion of the vacuum distillation I have a clear, resinous, viscous, inter-reaction mass, composed of incompletely polymerized anhydrous urea-formaldehyde. This material I find extremely useful in processing in any one of a number of possible ways, according to the product which I ultimately desire to produce.

CAST MATERIALS

It is possible to cast this inter-reaction material and then cure the same under moderate heat, as for example in a range from about 65° C. to 100° C., the temperature range being higher in general than that used in the prior art, owing to the absence of water or free formaldehyde which could cause a volatilization and strain or disintegration during curing at the higher temperatures. The finished product is bright, clear, strong, resilient and has a high index of refraction.

MOLDING POWDERS

It is also possible to form a molding powder of this material, by a new process which I have discovered, this process consisting of reducing the material to a spongy, flaked, attenuated, partially polymerized mass by subjecting the inter-reaction material to further vacuum at a temperature preferably within a range of about 75° C. to 100° C., for a period of about six to seven hours, more or less of course as noted by the results. In performing this step, I preferably lay the material in a shallow container, so as to present a large, shallow surface, preferably not more than about two inches deep. The applied vacuum causes the material to expand to a spongy, distended, attenuated form of several times its original volume. This mass may readily be crushed into a powder and may be accomplished simply by the fingers. For fine results, however, it is desirable to grind in a pebble mill, grinder or crusher for a relatively short time, such as a few minutes to several hours, depending upon the amount of the material.

This subdivided material may then be used as a molding powder in the conventional manner, by applying heat and pressure and then fully curing, producing if desired a clear, transparent molded article.

If it is expedient to modify flowability of the molding powder to suit various sizes and types of molds, this may be done by adding a further quantity up to about 25% of the viscous inter-reaction product, or a mixture of additional inter-reaction product with suitable waterproofing or plasticizing agents.

ATTENUATION

It is also possible to make sheet material, attenuated filaments or various articles of other shapes, by extruding or attenuating the inter-reaction product obtained from the vacuum distillation and then curing. Here again various plasticizers and waterproofing agents may be added as desired. When producing attenuated filaments, this is preferably done with a thermoplastic substance, and extremely fine, flexible, elastic, strong filaments may be readily produced.

The material may also be blown into shapes, as for example into partible molds. When performing such steps, it may be advisable to lower the pH of the inter-reaction product, just prior to blowing or attenuation, to a pH at which the mass will readily set. This may be in a range of about 2.2 to about 4.2, depending on size of article and the time of blowing. The article may then be cured as necessary. If sufficient thermoplastic substances are added, the material may be set by chilling caused by contact with the mold.

DISSOLVING IN SOLVENTS

It is also possible to use the said inter-reaction condensation product, or the same after it has been partially polymerized a predetermined degree, by dissolving the same in a suitable solvent, such as water, benzyl alcohol, ethyl alcohol, methyl alcohol, secondary butyl alcohol, isopropyl alcohol, ethylene glycol, propylene glycol, acetone, diacetone, methyl ethyl ketone, chloroform, .rbon tetrachloride, benzol, toluol, xylon, mersol, benzyl benzoate, ethyl acetyl glycolate, butyl acetate, amyl acetate, dieylene acetate, ethyl-ether ethylene glycol acetate, monomethyl ether, glycerine ether, butyric ether, mesityl acetyl oxide and aldol, or suitable combinations thereof. Other solvents may of course be used.

The dissolved material may then be sprayed, applied in film form as a paint, varnish, ink or lacquer, or may be laminated with sheet materials such as paper, asbestos, woven fabrics, and fibrous products, or may be applied as a coating for felts, textiles or filaments of any desired nature, such as wood pulp, artificial silk, cotton, flax, mineral fibers or the like. It may be used as a coating material for various fabrics or sheet materials to produce oil cloths, artificial leathers, linoleums, or as a stiffening agent for various fabrics such as straw or felt, lampshades, bookbinding, canvas, paper or the like. After the material has been applied the solvent may be evaporated, and then the residue of urea-formaldehyde fully polymerized or cured.

In this regard it is to be noted that when water is used as a solvent it does not cause an hydration of the material, owing to the absence of all free formaldehyde. I have discovered that the presence of free formaldehyde in the material causes gelatinization and the water to be combined, rendering the material weak, brittle and subject to disintegration under heat, cold or other adverse conditions.

It is also to be noted that various pigments, dyes or other coloring matters or other materials may be added as desired.

WATERPROOFING AGENTS

While a material formed directly from my anhydrous inter-reaction product is not hygroscopic, and when properly cured, may withstand the action of heat or boiling water for a considerable period of time, nevertheless I have discovered that the material may be further improved as to water-resisting properties by adding suitable waterproofing agents. These are preferably added after vacuum distillation; and in amounts up to about 25% as desired. These waterproofing agents are water-repellent substances which are compatible with the inter-reaction product.

Among the waterproofing agents which I have successfully used are various phthalates such as ethyl phthalate, diethyl phthalate, butyl phthalate, dibutyl phthalate and diamyl phthalate. I have successfully used various oils, especially castor oil. Camphor may likewise be employed. With some slight interference with transparency, commercial mineral oils and linseed oil, soya bean oil, olive oil, etc., may be employed.

If desired, these waterproofing agents may be added before vacuum distillation. The exact point at which the waterproofing agent is added is not critical.

When a suitable waterproofing agent is added, the condensation product of my invention is non-hygroscopic, and is not seriously affected by being boiled in contact with water for a period of one or two hours, or even longer. At all ordinary temperatures from below freezing to about 200° C., or even higher, the condensation product has no substantial tendency to absorb water or to decompose. After polymerization, the condensation product is substantially insoluble in the usual solvents, such as boiling water, alcohol, etc. Alkalis do not affect it. The product is clear and without color, although aniline dyes or pigments of any desired kind may be added.

PLASTICIZERS

It is to be observed that the aforementioned waterproofing agents may also act as plasticizers in rendering the material more plastic and workable, and if sufficient amounts of these waterproofing agents are added the material may be rendered permanently thermoplastic.

I may also render the material thermoplastic by adding various other plasticizers, such as benzyl alcohol, camphor, borneol, transparent cellulose compounds, vinylite resins, methyl methacrylate resins, acrylic resins, or other suitable material. The transparency is not affected by these plasticizers. Of course, other plasticizers or thermoplastic materials may also be added.

It is to be noted that these waterproofing or plasticizing agents may be added to the molding powders as noted above, or the molded, attenuated or cast materials.

FILLERS

The condensation product produced in accordance with my invention may be mixed with subdivided or fibrous material, for example paper pulp, sawdust, asbestos, mineral fibers, textile fibers, ground up resins, subdivided inorganic materials, pigments, whiting, lamp black, litharge, lithopone, etc., to produce various molded objects. The resulting product is, of course, not transparent. I preferably use the completely anhydrous inter-reaction product as obtained from the vacuum still and as properly waterproofed or plasticized, and mix this with dry fibrous or subdivided material in suitable proportions.

I find that as much as 65% of filler may be employed. A molding pressure of about one to two and one-half tons per square inch at a temperature of about 250° F. to 300° F., may be used in molding.

USE OF UREA-FORMALDEHYDE AS PLASTICIZER

Another important feature of the present invention is its use as a plasticizer itself in various materials such as transparent cellulose compounds, examples of which are cellulose nitrate (pyroxylin), cellulose acetate and cellulose hydrate. At the present time relatively expensive camphor is being used. If desired, a wide variety of solvents which dissolve both the urea-formaldehyde inter-reaction product and the cellulose compounds, may be employed. Examples of suitable solvents have been mentioned hereinabove, although water should preferably be excepted.

Prior efforts to incorporate together transparent cellulose compounds and transparent urea-formaldehyde type condensation products have resulted in the production of opaque or cloudy non-homogeneous products, due, I find, to the presence of water in the urea-formaldehyde type condensation product. Where, however, the urea-formaldehyde type condensation product is substantially anhydrous, the mixture with transparent cellulose compounds results in the production of a transparent product. The solvents employed can of course be eliminated after mixing and at the time the mixed condensation product is cast or otherwise used. On the other hand, where the mixture is to be used in solution, as in a lacquer, the solvents may be retained until the lacquer is put to its ultimate use.

When the solvents have been evaporated, the cellulose compounds and the urea-formaldehyde produce a clear monomeric structure.

The use of transparent cellulose compounds with urea-formaldehyde type condensation products is also desirable because the transparent cellulose compounds, particularly cellulose nitrate, exert some waterproofing action on the urea-formaldehyde type condensation products, rendering the use of another waterproofing agent less important.

When using my product in the lacquer and varnish field, I may intermix my syrupy inter-reaction product with cellulose compounds. The inter-reaction product from the vacuum distillation may simply be thinned with any suitable lacquer solvent such as those mentioned hereinabove, with the exception of water. After application the solvent evaporates, leaving the urea-formaldehyde and the cellulose compound dispersed therein.

I will give below a few examples of my process, selecting from numerous reactions those which I regard as typical and omitting the aspects of the process which are clearly obvious to every chemist familiar with urea-formaldehyde type condensation products.

Example 1

In 680 cc. of freshly made formaldehyde 35% solution whose pH is about 6.2, I dissolve 300 grams of urea and then bring to a boil. After it has been brought to a boil I then add another 50 grams of urea dissolved in another 100 cc. of commercial formaldehyde whose pH may be about 3.2, and the entire mass is again brought to a boil in a vessel equipped with a reflux condenser. The addition of the second urea-formaldehyde batch may cause the pH of the mass to adjust itself to about 4.4, depending on the exact pH of the additions of formaldehyde and the exact quantities admixed.

The viscosity of the mass as it is refluxed will remain substantially constant until the end point is reached. If the pH is about 4.4, this will generally be in about five minutes. The viscosity may be indicated by any of the means noted hereinabove. At the conclusion of the condensation stage, I then vacuum distill, measuring at intervals the weight of the material remaining in the reflux condenser, and continuing vacuum distillation until about 100% of the water is removed. This reaction product may then be cast and cured from about 60° C. to 100° C., or treated as mentioned more fully hereinabove.

Example 2

The acidity of 216 pounds of 35% commercial formaldehyde solution in water is adjusted to give a pH value of 6.2 by adding triethanolamine. The amount of triethanolamine depends upon the acidity of the formaldehyde. The formaldehyde after adjustment of its acidity has an index of refraction of 1.3758. In the formaldehyde solution whose acidity has been adjusted, 75 pounds of urea are dissolved by heating in a flask connected with a reflux condenser until the mixture is just brought to a boil. The acidity of the reaction mixture is then adjusted to obtain a pH value of 4.6 by adding a 10% water solution of citric acid. The quantity of citric acid added depends upon the amount of triethanolamine used. After adjustment of the acidity the index of refraction of the reaction mixture is 1.4124.

The condensation mixture is boiled until an end point is reached at which the index of refraction is between 1.4180 and 1.4213. In the apparatus which I employ, the time required is from 45 minutes to one hour where the pH is about 4.4.

During the boiling, samples for testing in the refractometer are taken every 10 minutes. At the same time that the refractometer samples are taken, viscosity measurements are desirably made by timing the discharge of a standard sample from a standard pipette at standard temperature. No substantial change in viscosity is noted before the end point is reached.

After the end point is attained, the condensation mixture is removed to a vacuum still and vacuum distillation is continued until 100% of water is removed. About 12.5 pounds of dibutyl phthalate are added, producing a temporary cloudiness in the condensation mixture, and vacuum distillation is continued for a short time until the cloudiness completely disappears and the condensation is perfectly transparent. The index of refraction is now about 1.5234. The product is cast desirably into lead molds to make shapes, such as sheets, blocks, rods, tubes, concave and convex objects and other shapes such as are produced by casting metal.

*Example 3*

To 780 cc. of a 35% water solution of commercial formaldehyde, about 3 to 15 drops of triethanolamine are added to produce a pH of 6.2. In the formaldehyde solution of adjusted acidity, 350 grams of urea are dissolved by bringing the mixture to a boil in a vessel equipped with a reflux condenser. The index of refraction is now about 1.4124. The pH is now adjusted by adding 3 cc. of a 20% water solution of citric acid, producing a pH of 4.6. The index of refraction of the condensation mixture is now 1.4124. After refluxing for one hour, the index of refraction is approximately 1.4180.

Vacuum distillation is now carried out until an index of refraction of 1.5234 is obtained, at which point substantially 100% of water has been removed. 50 cc. of dibutyl phthalate are added and the vacuum distillation is continued until the condensation mixture is clear. The product is then cast.

*Example 4*

The procedure used in Example 1 may be followed, with the exception of substituting thiourea for urea either in whole or in part, the resulting product being clear, anhydrous and stable, although generally more plastic and resilient than the urea product.

*Example 5*

Any of the Examples 1 to 4 may be used, adding to the reaction mass at any suitable time, preferably after vacuum distillation, a desired quantity of plasticizer up to about 25%. Examples of the plasticizers have been noted hereinabove.

*Example 6*

In place of, or in addition to, the plasticizers of Example 5, suitable waterproofing agents, examples of which have been mentioned hereinabove, may be added.

*Example 7*

Any of the procedures of Examples 1 to 4 may be followed up to the end of vacuum distillation, the material may then be laid in shallow pans, and have moderate heat and vacuum applied to it until the mass has been distended into a spongy attenuated mass which may readily be crushed into a subdivided state suitable for molding under heat and pressure.

*Example 8*

After following any of the procedures, as for instance those mentioned in Examples 1 to 4, I may dissolve the inter-reaction mass in water, alcohol or other suitable solvent or the like, as mentioned hereinabove, and then apply the mass as a spray or in film form, as in ink, varnish or paint. Of course, when making a paint, or other suitable ingredients such as oil, pigment dryers, etc., may be added if desired. The solvent may then be volatilized and the mass cured. Modifications and variations may be resorted to.

The above examples are not intended to restrict my disclosure, but merely to facilitate practice of the invention by giving typical illustrations of detailed procedure which I have carried out. By following the procedure referred to it is possible to obtain complete elimination of the water without the difficulties encountered in the prior art and without harmful influence upon the transparency of the condensation product.

The index of refraction values given were obtained by withdrawing very small samples in tubes of minute cross-section, cooling the samples to room temperature and then making the readings in a standard refractometer.

In view of my invention and disclosure, variations and modifications to meet individual whim or particular need will doubtless become evident to others skilled in the art, to obtain all or part of the benefits of my invention without copying the structure shown, and, therefore, are to be considered to fall within the reasonable spirit and scope of my invention as set forth in the appended claims.

I claim:

1. A urea-formaldehyde condensation product, which is substantially anhydrous and free from uncombined formaldehyde, the condensation of said product having been reacted in an acid aqueous medium and the reaction stopped at an end point at about which the viscosity begins to increase and the water having been removed at said end point.

2. A urea-formaldehyde inter-reaction product comprising an urea and formaldehyde inter-reacted with one another in proportions between one to one and one-half molecules of formaldehyde to one molecule of urea, said inter-reaction product containing not more than about 5% of water, the condensation of said product having been reacted in an acid aqueous medium and the reaction stopped at an end point at about which the viscosity begins to increase and the water having been removed at said end point.

3. A urea-formaldehyde inter-reaction product comprising a urea and a formaldehyde reacted with one another in proportions of about one molecule of formaldehyde to one molecule of urea, said inter-reaction product being substantially free from water and uncombined free formaldehyde, the condensation of said product having been reacted in an acid aqueous medium and the reaction stopped at an end point at about which the viscosity begins to increase and the water having been removed at said end point.

4. The process of producing a urea-formaldehyde condensation product, which comprises condensing urea and formaldehyde at a pH in a range of about 6.2 to 4.2 to about an end point at which the viscosity begins to increase, stopping the reaction at said end point, and then removing water from the reaction mass at said end point.

5. The process of producing a stable urea-formaldehyde condensation product, which comprises condensing urea and formaldehyde at a pH in a range of about 6.2 to 4.2 to about an end point at which the reaction mass begins to increase in ohmic resistance, stopping the reaction at said end point, and then removing water at said end point.

6. The process of condensing urea and formaldehyde which comprises boiling the same under acid conditions to about an end point at which the viscosity increases, then stopping the reaction at this point and removing the water at this point.

7. The process of producing a stable urea-formaldehyde product molding powder which comprises condensing urea and formaldehyde under conditions in which the pH is between about 6.2 to 4.2 until the attainment of an end point at which the viscosity begins to increase, dehydrating the condensation product at this point by vacuum distillation to produce an anhydrous inter-reaction product, applying vacuum under moderate heat to produce a distended, spongy, partially polymerized mass, and reducing said mass to a subdivided state.

8. The process of producing a molding powder of a urea-formaldehyde type condensation product which comprises producing as claimed in Claim 17 a viscous, substantially anhydrous inter-reaction product of urea and formaldehyde containing substantially no uncombined formaldehyde, applying vacuum to the inter-reaction product under moderate heat to produce a partially polyemrized, distended, spongy mass, and reducing said mass to a molding powder.

9. The process of producing a urea-formaldehyde condensation product which comprises admixing urea and formaldehyde at a pH of about 6.2, bringing the mass to a boil, then lowering the pH to not less than about 4.2, continuing the reaction of the urea and formaldehyde until the attainment of about an end point at which the viscosity begins to increase, stopping the reaction at said end point, and removing the water from the reaction mass at said end point.

10. The method of producing a clear, stable, urea-formaldehyde condensation product which comprises admixing urea and formaldehyde in proportions of at least about 1.5 molecules of formaldehyde to 1.0 molecule of urea, condensing the mass at a pH between 6.2 and 4.2 to an end point at which the viscosity of the mass begins to increase, and then at said end point removing by vacuum distillation the water and uncombined formaldehyde.

11. The process of producing a stable urea-formaldehyde condensation product, which comprises admixing urea and substantially pure formaldehyde, having a pH of about 6.0 to 6.4, bringing the mass to a boil, admixing an additional quantity of dissolved urea in commercial formaldehyde having a pH less than about 6.0, and thereby bringing the pH of the mass within a range of about 4.2 to 6.2, condensing the reaction mass to an end point at which the viscosity begins to increase, stopping the reaction at said end point, then removing water and uncombined formaldehyde at said end point.

12. The process of producing a clear, transparent urea-formaldehyde condensation product which comprises reacting urea and formaldehyde at a pH between about 4.2 and 6.2, to an end point at which the viscosity begins to increase, vacuum distilling the mass at said end point to remove substantially all of the water and uncombined formaldehyde, adding a clear transparent plastizer, and then curing the mass to solidity.

13. A urea formaldehyde condensation product produced by the process as claimed in claim 6.

14. The method of preparing an aqueous solution of urea formaldehyde capable of eliminating the aqueous medium by volatilization and forming a strong, tough film which comprises, reacting urea and formaldehyde under acid conditions with an excess of formaldehyde over urea and at an elevated temperature, stopping the reaction at an end point at about which the viscosity of the mass begins to increase by applying a vacuum and vacuum distilling off substantially all the water and free formaldehyde and then dissolving the mass in water.

15. The method of producing a clear, transparent resin which comprises intermixing a urea and a formaldehyde, with an excess of formaldehyde over urea, reacting said substances in an acid medium under heat, to an end point at about which the viscosity begins to increase, vacuum distilling at said end point to remove substanially all the water and free formaldehyde, and polymerizing said mass to a hard, tough product.

16. A water solution of urea and formaldehyde from which the water may be volatilized leaving urea formaldehyde condensation product capable of being polymerized to a hard solid, which comprises the product as claimed in claim 1 which is free from free uncombined formaldehyde, and an aqueous vehicle in which said product is dissolved after the water and free formaldehyde originally in the reaction mass of said product have been removed.

17. The method of producing a urea formaldehyde condensation product which is substantially anhydrous and free from uncombined formaldehyde, which comprises reacting urea and formaldehyde in an acid aqueous medium, stopping the reaction at an end point at about which the viscosity begins to increase, and removing the water at said end point.

18. The method of preparing a solution of urea formaldehyde capable of eliminating the solvent by volatilization and forming a strong tough product which comprises reacting urea and formaldehyde in an acid aqueous medium, stopping the reaction at an end point at about which the viscosity begins to increase, removing the water at said end point, and then dissolving the mass in a volatilizable solvent.

19. The process of producing a molding powder which comprises condensing urea and formaldehyde in an acid aqueous medium until the attainment of an end point at which the viscosity begins to increase, dehydrating the condensation product at this point by vacuum distillation, laying the resulting inter-reaction material to present a relatively large shallow surface, subjecting said material to further vacuum at a temperature in the neighborhood of about 75° C. to 100° C. to cause the material to expand to a spongy distended form greater than its original volume, and then crushing said material to a molding powder.

EUSTACE GLYCOFRIDES.